United States Patent [19]

Mizuno et al.

[11] Patent Number: 5,008,834
[45] Date of Patent: Apr. 16, 1991

[54] ROBOT CONTROL APPARATUS

[75] Inventors: Tohru Mizuno, Tama; Takayuki Ito, Minamitsuru, both of Japan

[73] Assignee: Fanuc Ltd., Minamitsuru, Japan

[21] Appl. No.: 265,673

[22] PCT Filed: Apr. 9, 1988

[86] PCT No.: PCT/JP88/00362

§ 371 Date: Oct. 28, 1988

§ 102(e) Date: Oct. 28, 1988

[87] PCT Pub. No.: WO88/07916

PCT Pub. Date: Oct. 20, 1988

[30] Foreign Application Priority Data

Apr. 10, 1987 [JP] Japan ................ 62-088331

[51] Int. Cl.$^5$ .................... G05B 19/00; B25J 9/16
[52] U.S. Cl. .................... 364/513; 364/192
[58] Field of Search .................... 364/191–193, 364/513, 474.23, 200, 900

[56] References Cited

U.S. PATENT DOCUMENTS

| | | | |
|---|---|---|---|
| 4,218,757 | 8/1980 | Drogichen | 364/200 |
| 4,589,063 | 5/1986 | Sheh et al. | 364/200 |
| 4,649,514 | 3/1987 | Berger | 364/200 |
| 4,689,755 | 8/1987 | Buote | 364/513 |
| 4,730,258 | 3/1988 | Takeda et al. | 364/513 |

Primary Examiner—Allen R. MacDonald
Attorney, Agent, or Firm—Staas & Halsey

[57] ABSTRACT

A robot control apparatus has robot control conditions set by a monitor program described in a robot language. Since a system program ordinarily is fixedly designed into a robot control apparatus, the program cannot be freely set and modified by the user. However, by storing part of the system program for constantly monitoring robot operations in a user area USER and making this part of the system program open to a user, unnecessary functions can be deleted, presently existing functions can be modified and functions can be added.

6 Claims, 6 Drawing Sheets

| | |
|---|---|
| P0 | (NO ACTIVITY) |
| P1 | (NO ACTIVITY) |
| P2 | GRASP |
| P3 | (NO ACTIVITY) |
| P4 | (NO ACTIVITY) |
| P5 | PLACE |
| P6 | (NO ACTIVITY) |
| P7 | END |

FIG. 6(b)

ROBOT CONTROL APPARATUS

BACKGROUND OF THE INVENTION

1. Field of the Invention

This invention relates to a robot control apparatus in which robot control conditions are set by a monitor program described in robot language.

2. Description of the Related Art

In order for a predetermined task to be performed automatically using a robot, it is necessary that the robot first be taught a series of activities such as grasping of an object, moving the object and placing the object at a predetermined position. Teaching operations of this kind are generally done on the user side. In such case, the operation conforming to the taught instructions is performed based on a user program stored within a robot control apparatus.

Figure 6A:
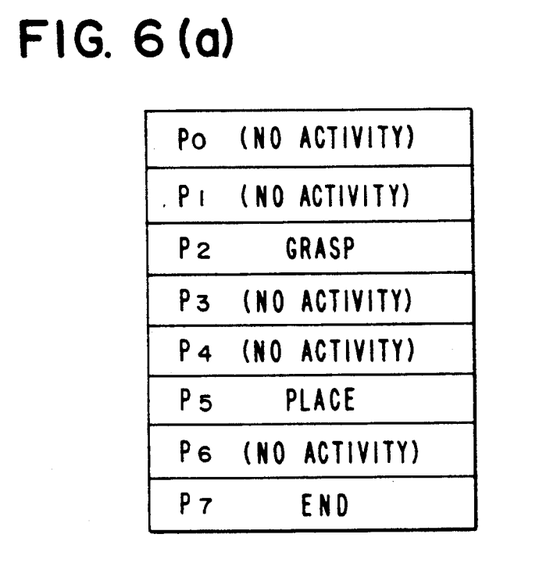
Figure 6B:
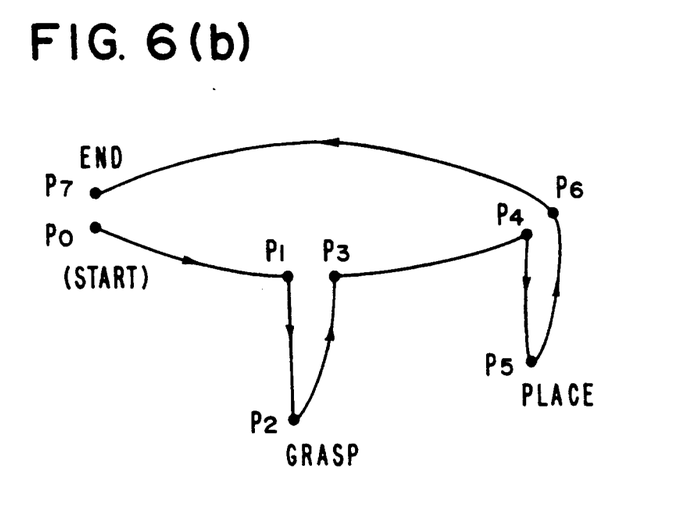

FIGS. 6(a) and (b) respectively illustrate a user program for teaching a robot a series of operations, and the operating procedure of the robot based on this user program. Programs P0 through P7 shown in FIG. 6(a) are described in a predetermined robot language. When the robot is made to perform the series of operations shown in FIG. 6(b), the user program is started on the robot control apparatus side by a system program to output motion commands for the robot.

In the above-mentioned system program, it is required that the status of the robot be monitored at all times and that the operations be performed under predetermined conditions. This status output function required for the robot control apparatus is described in the form of specific instructions for, e.g., generating a predetermined output when the robot is in position, generating an output when an arm is at a fully retracted position, and halting robot motion when a safety rack is open. Since the robot must be monitored at all times after the introduction of power, the program for implementing this status output function cannot be described in a robot language the same as that of the user program run by being started from the system program. In order to perform an operation of this type, a robot language having a function referred to as a "monitor" function is available, but the robot operation cannot be monitored at all times by a program described in this language.

More specifically, since an operation requiring constant monitoring must generally be incorporated in the system program, the output of robot status in the conventional robot control apparatus is monitored at all times by the system program. However, the entire system program is stored beforehand in a read-only memory (ROM) and is designed to be fixed in the robot control apparatus. As a result, the user cannot set and modify the program at will.

Accordingly, when it is desired to modify the present contents of a robot operation or add another operation to the present operation, the system program inside the ROM must be altered. A problem that arises is that in order to accomplish this, the user must replace the read-only memory (ROM) on each such occasion.

SUMMARY OF THE INVENTION

The present invention has been devised to solve the afore-mentioned problems and its object is to provide a highly versatile robot control apparatus in which, in order to delete, modify or add types of monitoring operations required to be performed at all times, a user is capable of readily deleting, modifying and adding input/output conditions to be monitored without altering in any way a system program stored in a ROM.

Another object of the present invention is to provide a robot control apparatus which enables a user to set optimum control conditions conforming to the system merely by describing input/output signals and conditions to be constantly monitored using ordinary robot language without learning a special monitor language.

In accordance with the present invention, there is provided a robot control apparatus for controlling motion of a robot based on a program prepared in robot language, comprising memory means, for storing a user program described in robot language and for storing a monitor program for the purpose of monitoring a plurality of status outputs of the robot, starting means for accessing the monitor program from a system program at a fixed period at all times, and output means for outputting specific instructions corresponding the status outputs of the robot.

Thus, in the robot control apparatus of the invention, when a specific flag contained in the system program is made, e.g., "1", a jump is made to a vector address corresponding to this flag by the starting means such as a vector address corresponding table, and the user program stored at this address is executed so that a specific instruction corresponding to the robot status output can be output.

In order to constantly monitor the robot activities, a portion of the system program is opened to the user. This portion can be described using the same robot language as that of the user program. As a result, the user can readily delete, modify and add functions for controlling robot activities that are require to be monitored at all times.

DESCRIPTION OF THE PREFERRED EMBODIMENT

Figure 1:
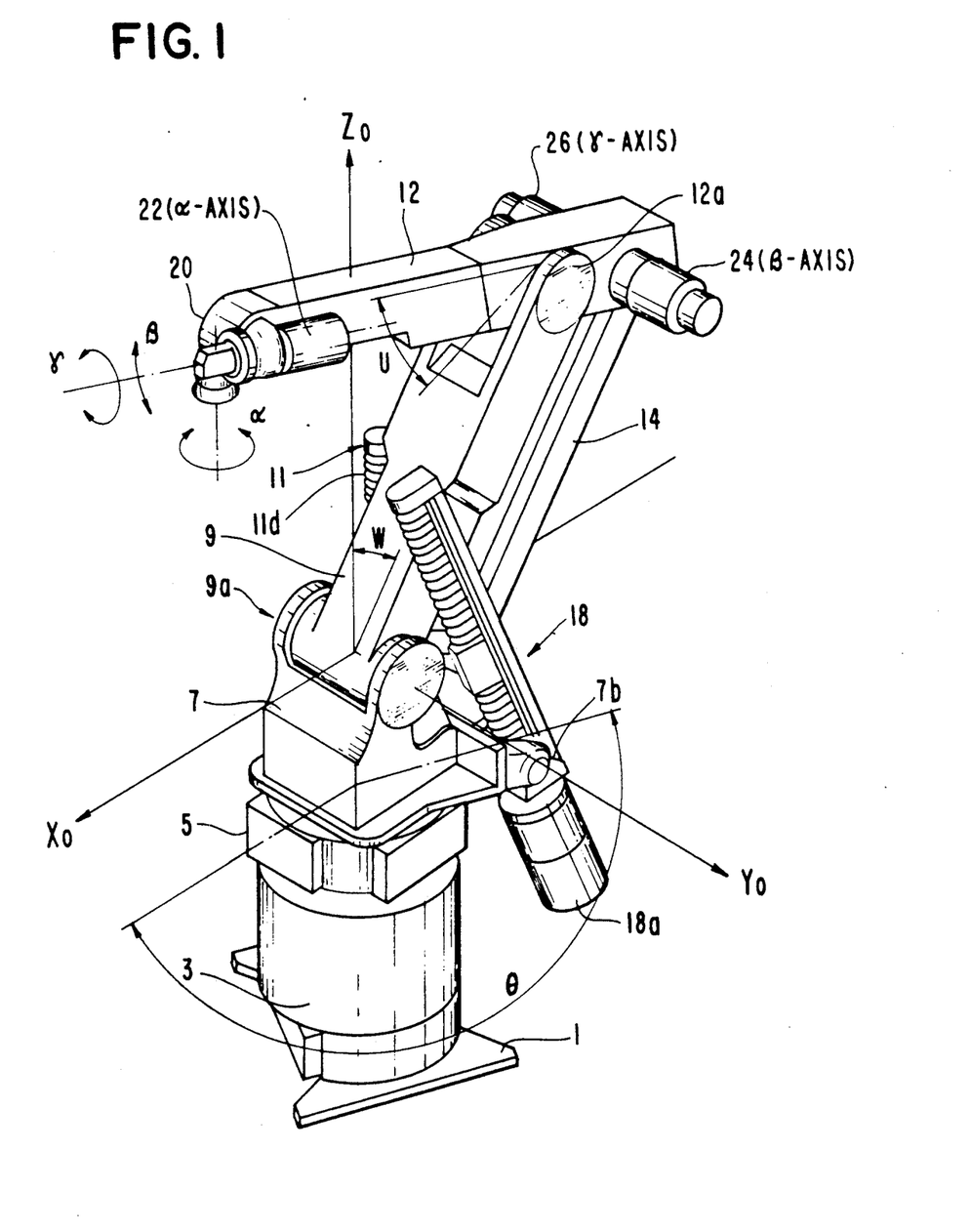
FIG. 1 is a diagram of a robot controlled by the robot control apparatus of the present invention.

An embodiment of the present invention will now be described in detail with reference to the drawings FIG. 1 is a perspective view of a robot, namely an articulated robot having six controlled axes, which are controlled by the robot control apparatus of the invention. In the Figure, numeral 1 denotes a base supporting the articulated robot. Mounted on an upper portion of the base 1 is a $\theta$-axis servomotor 3 for rotating each axis about a vertical axis ($Z_0$ axis). The $\theta$-axis servomotor 3 is provided with a $\theta$-axis unit 5. The $\theta$-axis unit 5 is rotated by the $\theta$-axis servomotor 3. Fixed on the $\theta$-axis unit 5 is a W-axis unit 7 on which a W-axis arm 9 is axially supported by a shaft 9a, and freely rotatable.

Numeral 11 denotes a W-axis drive mechanism comprising a W-axis servomotor, a W-axis ball screw and a W-axis nut.

A U-axis arm 12 is rotatably supported at the end of the W-axis arm 9 by a shaft 12a. The upper end of a U-axis intermediate link 14 is rotatably supported on the rear end of the U-axis shaft 12. A U-axis lower link is freely rotatably supported in coaxial relation with respect to the shaft 9a of the W-axis, and the lower end of the U-axis intermediate link 14 and the end portion of the U-axis lower link are freely rotatably supported on each other. The W-axis arm 9 and the U-axis intermediate link 14 are arranged in parallel, as are the U-axis 12 and U-axis lower link. These form a link mechanism. Numeral 18 denotes a U-axis drive mechanism. The U-axis drive mechanism 18 comprises a U-axis servomotor 18a, a U-axis ball screw and a U-axis nut. The U-axis servomotor 18a is rotatably supported on a support portion 7b extending from the W-axis unit 7.

The end of the U-axis arm 12 is provided with a wrist mechanism (hand) 20, which is rotated by the $\alpha$-axis servomotor 22, bent up and down by the $\beta$-axis servomotor 24, and twisted by the $\gamma$-axis servomotor 26. The structure and operation of these elements are well-known and a detailed description thereof is omitted. A tool such as an arc welding torch is attached.

Figure 2:
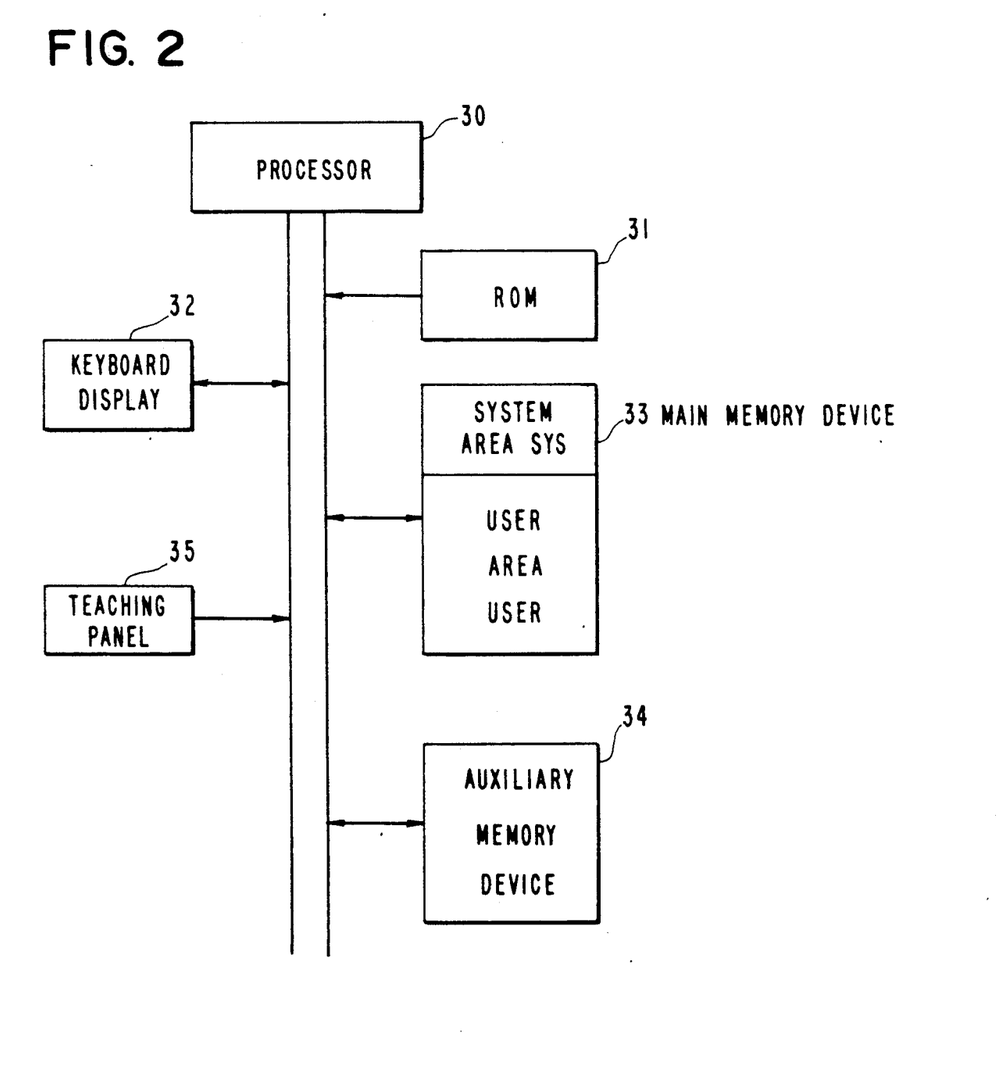
FIG. 2 is a block diagram of the robot control apparatus of the present invention.

FIG. 2 is a block diagram of a robot control apparatus for controlling a robot of the kind shown in FIG. 1. In FIG. 2, a processor 30 is adapted to operate in accordance with a system program stored in a read-only memory 31. Connected to the processor 30 are the read-only memory (ROM) 31 storing the system program, a keyboard display 32, a main memory device 33, an auxiliary memory device 34 and a teaching panel 35.

The keyboard display 32, which has a key (not shown) for starting the operation of the robot control apparatus, is for inputting required parameters (e.g., positional coordinates, velocity, etc.) during execution of a program described in robot language. The main memory device 33 is composed of a system area SYS and a user area USER.

Figure 3:
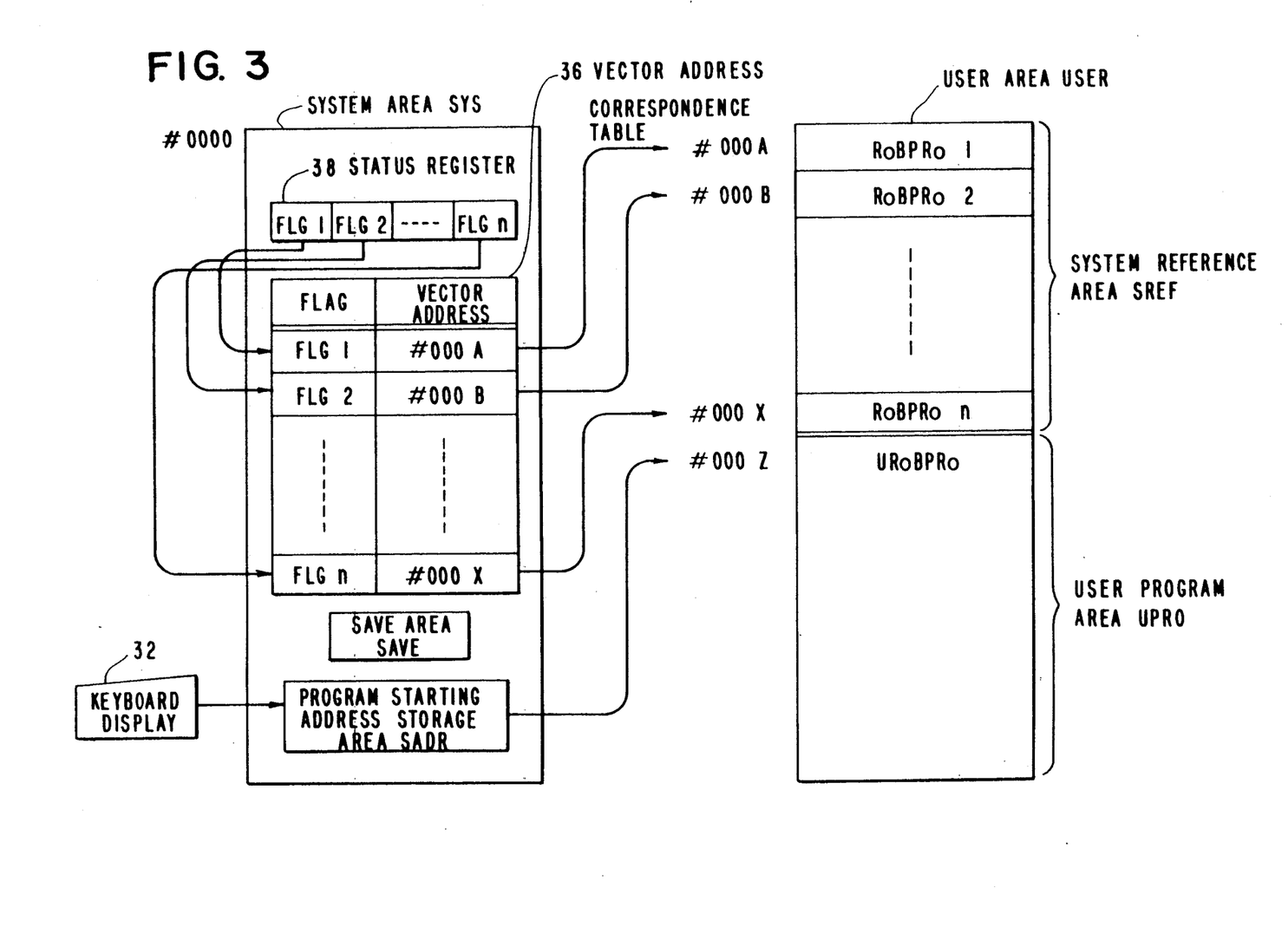
FIG. 3 is a block diagram illustrating the detailed construction of a main memory device illustrated in FIG. 2.

The configurations of the system area SYS and user area USER are shown in detail in FIG. 3.

The system area SYS is an area in which the system program for managing the operation of the robot control apparatus is stored. The system program is stored beforehand in the ROM 31 shown in FIG. 2. When power is introduced to the robot control apparatus, the system program is read out of the ROM 31 and initially loaded into the system area SYS of main memory device 33.

The system area SYS has a status register 38 indicating the operating status of the robot, and a correspondence table 36. The status register 38 comprises n-number of flags $FLG_1$ through $FLG_n$. By way of example, when the flag $FLG_1$ is "1", this indicates execution of monitoring for determining whether the robot is in position; when the flag $FLG_2$ is "1", this indicates execution of monitoring for determining whether the arm is in the fully retracted position; and when flag $FLG_n$ is "1", this corresponds to execution of monitoring to determine whether the safety rack is open. The flags $FLG_1$ through $FLG_n$ in the status register 38 of system area SYS correspond to a system reference area SREF in the user area USER of main memory device 33. In accordance with the correspondence table 36 from the system program, when a predetermined flag, e.g., $FLG_1$, is "1", a jump is made to a vector address #000A in the user area USER. The vector addresses #000A, #000B ..., #000X correspond to leading addresses of system reference programs $ROBPRO_1$ through $ROBPRO_n$, which are part of the user program stored in the system reference area SREF in the user area USER. Accordingly, by preregistering a program $ROBPRO_n$ "if current-pos[1]=lower lim[1]THEN RDO[5]=ON", by way of example, as a background monitor in #000X, processing for checking individually set robot activities and for stopping the operations becomes possible.

In addition to the foregoing, the system area SYS has a save area SAVE for returning to the system program in the system area SYS after the system program jumps to the predetermined vector address in the user area USER. It is arranged so that the address which prevailed prior to the jump to the vector address will be stored here. The leading address #000Z of a user program UROBPRO in which a series of motions is described in robot language is stored in a program starting address storage area SADR.

When the key (not shown) on the keyboard display 32 for starting the operation of the robot control apparatus is pressed, the system program refers to the program starting address storage area SADR and executes the user program UROPPRO from the address #000Z.

The user area USER is composed of the system reference area SREF and the user program area UPRO. The system reference programs $ROBPRO_1$ through $ROBPRO_n$ for outputting specific instructions corresponding to monitored robot states are stored in the system reference area SREF at vector addresses decided by the user. These system reference programs $ROBPRO_1$ through $ROBPRO_n$ are object programs compiled or interpreted by a compiler or interpreter.

The program $ROBPRO_1$ is for judging, for example, whether the robot is in position and for generating a specific instruction corresponding to this status output. The program $ROBPR0_2$ is for judging, for example, whether the arm is in the fully retracted position and for generating a specific instruction corresponding to this status output. The program $ROBPRO_n$ is for judging, for example, whether the safety rack is open and for generating a robot motion stop instruction corresponding to this status output.

The user program area UPRO stores the user program UROBPRO executed concurrently by background processing of the system program. A program stored as the user program UROBPRO is an object program obtained by compiling or interpreting a source program, which is described in robot language, by a compiler or interpreter.

Figure 4:
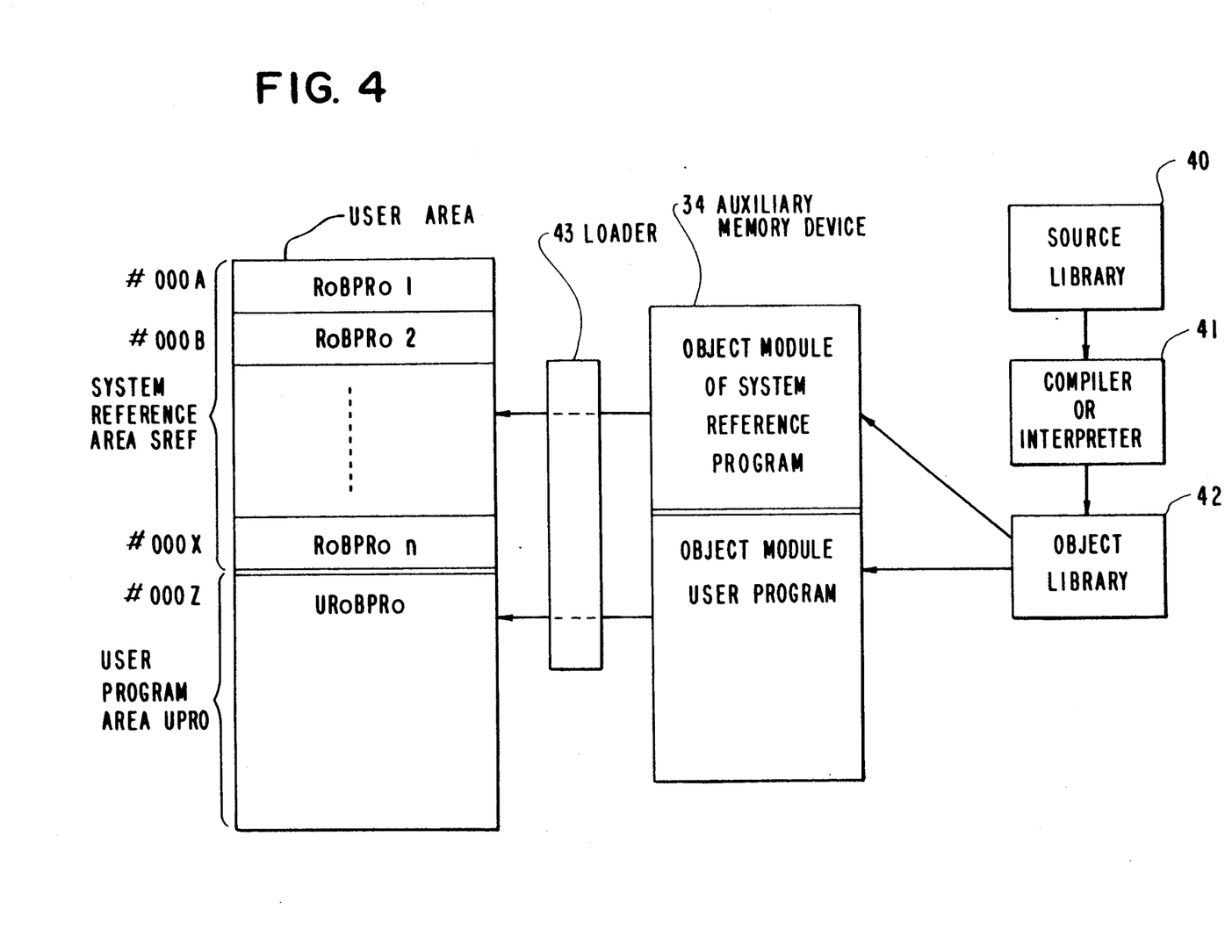
FIG. 4 is a diagram illustrating a procedure for loading a program into the main memory device.

FIG. 4 is a view for describing a procedure through which the system reference programs $ROBPRO_1$ through $ROBPRO_n$ and user program UROBPRO are loaded into the user area USER of the main memory device 33. A monitor program permanently stationed in the system area SYS is described in a robot language of a scheme the same as that of an ordinary user program and is stored is a source library 40 together with the user program described in robot language. A compiler or interpreter 41 interprets the program, which is described in robot language and stored in the source library 40, and stores the results in an object library 42 as an object program. The object program stored in the object library 42 is stored in the auxiliary memory device 34 as an object module of the system reference program and an object module of the user program. It is so arranged that these object modules are respectively loaded into the system reference area SREF and user program area UPRO of the user area USER by a loader 43.

The operation of the robot control apparatus having the foregoing construction will now be described using the flowchart of FIG. 5. It will be assumed that the user has already described the system reference program and user program in the source library 40 using robot language, and that the object modules obtained by compiling or interpreting these have been made to correspond to predetermined addresses #000A through #000X and the program starting address #000Z, respectively, of the user area USER.

Figure 5:
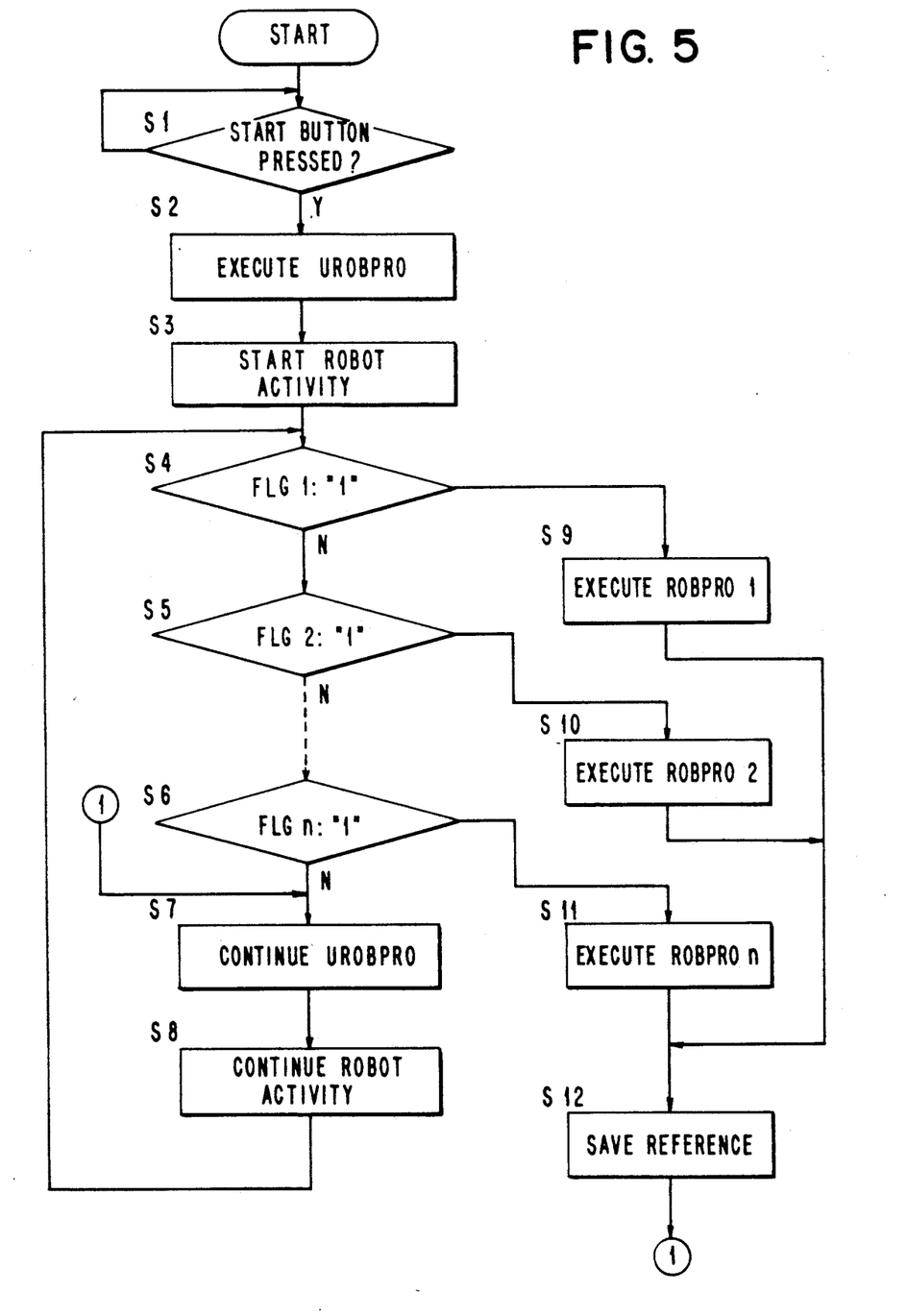
FIG. 5 is a flowchart illustrating the flow of processing performed by the robot control apparatus of the invention, and FIGS. 6(a) and (b) are diagrams respectively illustrating a program for causing a robot to perform a series of activities, and robot motions based on this program.

In FIG. 5, a step S1 calls for a determination as to whether the key on the key display 32 for starting the operation of the robot control apparatus has been pressed. If the key has been pressed, the program starting address storage area SADR of the system area SYS is referred to and the user program UROBPRO stored in the area SADR at the starting address #000Z is executed (step S2). In response to execution of this user program UROBPRO, the robot task program started by the system program commands the robot to perform a series of operations (step S3). The system program in the system area SYS is executed at all times during the time that the user program UROBPRO is being executed and the robot is performing the series of operations. It is arranged so that the system program operates at the moment power is introduced, even before the robot starts performing an operation.

Steps S4 through S6 and steps S9 through S12 executed by the monitor program described in robot language are implemented as processing of part of such a system program. More specifically, the processing of steps S4 through S6 are for checking the states of the flags $FLG_1$ through $FLG_n$ of the status register 35 decided by executing the system reference programs $ROBPRO_1$ through $ROBPRO_n$. Whether the flag $FLG_1$ is "1" is checked at the step S4, whether the flag $FLG_2$ is "1" is checked at the step S5, and, in similar fashion, whether the flag $FLG_n$ is "1" is checked at the step S6. When the flag $FLG_1$ is "1", it is determined whether the robot is in position and the program proceeds to step S9, at which a specific instruction corresponding to this status output is generated. Upon referring to the vector address correspondence table 36, a jump is made to the vector address #000A corresponding to the flag $FLG_1$ and the system reference program $ROBPRO_1$ is executed. Similarly, when the flag $FLG_2$ is "1", it is determined whether the robot arm is in the fully retracted position and the program proceeds to step S10, at which a specific instruction corresponding to this status output is generated. When the flag $FLG_n$ is "1", it is determined whether the safety rack is open and the program proceeds to step S11, at which a robot motion stop instruction is generated at this time. The system reference program $ROBPRO_n$ at the vector address #000X is executed. In order to return to the system program in the system area SYS after the processing of steps S9, S10, ... S11 is executed, the system program address which prevailed prior to the jump to the system reference $ROBPRO_1$ through $ROBPRO_n$ is stored in a save area SAVE.

After the processing of step S9, S10 or S11 is executed, the program proceeds to a step S12, where reference is made to the save area SAVE of the system area SYS and a return is effected to the system program address that prevailed prior to the jump to the system reference programs $ROBPRO_1$ through $ROBPRO_n$. As a result, the program proceeds to step S7, where execution of the user program UROBPRO is continued, and to step S8, where execution of robot operation is continued. The program then returns to step S4 in order to constantly monitor the status of the status register during this processing.

Thus, by arranging it so that part of the system program for constantly monitoring the robot activities is stored in the user area USER and opening part of this system program to the user, unnecessary functions can be deleted, presently existing functions can be modified and functions can be added. Furthermore, the system area SYS is provided with the status register 35 and the vector address correspondence table 36, in which leading addresses (vector addresses) of part of the system program in the user area USER are made to correspond to the flags $FLG_1$ through $FLG_n$ of the status register 35. Since the system reference programs $ROBPRO_1$ through $ROBPRO_n$ for outputting specific instructions corresponding to the robot status outputs are stored in the system reference area SREF at vector addresses set by the user, it is unnecessary to delete or modify the contents of the system area SYS and, hence, the contents of the ROM 31, even when robot functions are deleted, modified or added.

Thus, in accordance with the present embodiment, a system conforming to the user's demands can be constructed and a highly versatile robot control apparatus can be provided.

Though an embodiment of the present invention has been described, the invention is not limited thereto and can be modified in a variety of ways without departing from the scope of the claims.

The robot control apparatus of the invention is such that input/output status, operating conditions, etc., that are to be monitored at all times irrespective of whether teaching or playback is being carried out, can be prepared by a user at will using robot language. This makes it possible to construct a robot system conforming to user demands.

What is claimed is:

1. A robot control system for controlling the motion of a robot using a system program having first and second parts and a user program, said system comprising:
    storage means for storing the system program and the user program, said storage means having a system area and a user area, the first part of the system program being stored in the system area and providing a plurality of flags indicating operating status of the robot, the second part of the system program being stored in the user area and including monitor programs corresponding to the flags, the system area of said storage means includes at least register means for storing the flags; and
    a correspondence table for providing the predetermined location of the monitor programs within the user area based upon the flags; and
    processor means for continuously monitoring the operating status of the robot based on the system program and for processing the user program to generate motion commands for the robot, said processor means monitors the operating status of the robot by jumping from the first part of the system program to the second part.

2. A robot control method for controlling motion of a robot based on a user program prepared in robot language, said robot control method using a main memory device having a user area and a system area, said method comprising the steps of:

(a) storing a plurality of flags for monitoring status of the robot in the system area of a main memory device;

(b) storing system programs, described in robot language, in the user area of the main memory device at vector address locations corresponding to the flags; and (c) background processing the system programs based on the flags corresponding thereto when the user program is executed.

3. A robot control method according to claim 2, wherein step (c) comprises the substeps of:

(i) jumping from the system area to the user area to process the system programs; and (ii) returning to the system area after execution of the system programs.

4. A robot control system for controlling the motion of a robot using a system program having first and second parts and a user program, said system comprising:

storage means for storing the system program and the user program, said storage means having a system area and a user area, the first part of the system program being stored in the system area and providing a plurality of flags indicating operating status of the robot, the second part of the system program being stored in the user area and including monitor programs corresponding to the flags, the monitor programs are described in a robot language and located at a predetermined location within the user area, each of the monitor programs corresponds to one of the flags, and the second part of the system program is freely alterable as is the user program and only the first part of the system program is fixed; and processor means for continuously monitoring the operating status of the robot based on the system program and for processing the user program to generate motion commands for the robot, said processor means monitors the operating status of the robot by jumping from the first part of the system program to the second part.

5. A robot control system according to claim 4, wherein the system area of said storage means comprises:

register means for storing the flags; and a correspondence table for providing the predetermined location of the monitor programs within the user area based upon the flags.

6. A robot control system according to claim 4, wherein said processor means executes the system program in a background mode.

* * * * *